May 3, 1966   C. E. BODINGTON   3,249,526
SOLVENT DEWAXING PROCESS
Filed Oct. 10, 1962
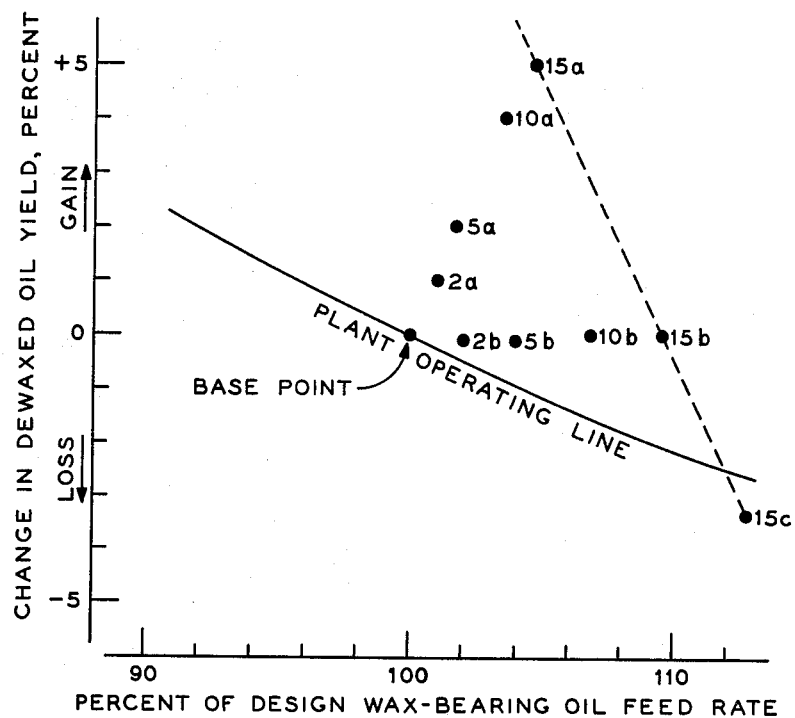
FEED: 75% CALIFORNIA WAXY
      25% MID CONTINENT
SOLVENT: 50% MEK
         40% BENZENE
         10% NAPHTHA
INITIAL SOLVENT TO FEED RATIO: 0.65
INITIAL TEMPERATURE: 170 °F.
FILTRATION TEMPERATURE: 0 °F.
INVENTOR
CHARLES E. BODINGTON
BY
ATTORNEYS United States Patent Office 3,249,526
Patented May 3, 1966

3,249,526
SOLVENT DEWAXING PROCESS
Charles Edward Bodington, San Anselmo, Calif., assignor to Chevron Research Company, a corporation of Delaware
Filed Oct. 10, 1962, Ser. No. 229,589
6 Claims. (Cl. 208—33)

This invention is concerned with processes for separating wax and oil from wax-oil mixtures. More particularly, the invention relates to solvent dewaxing processes wherein a wax-bearing petroleum oil is dissolved in a solvent and then chilled to a low temperature to precipitate the wax, and the solid hydrocarbons are then separated by filtration.

In the commercial operation of solvent dewaxing processes the wax-bearing oil to be dewaxed is mixed with a solvent which is selective for the nonparaffinic constituents of the oil, and which can therefore be referred to as a dewaxing or wax-rejecting solvent. Typical examples are the ketones, especially methylethylketone, which may be used alone or with other solvents including aromatic hydrocarbons. A typical solvent may comprise from 40 to 60% by volume methylethylketone, from 30 to 50 volume percent benzene, and the balance light hydrocarbons such as petroleum naphtha. Generally between 0.5 and 4 volumes of solvent are used per volume of oil feed, but greater or lesser ratios may be used depending on factors such as the viscosity and wax content of the wax-bearing oil and the degree of dewaxing desired. The function of the solvent is mainly to reduce the viscosity of the liquid phase and prevent precipitation of non-paraffins. It has been found advantageous to mix the oil and solvent at an initial temperature which is sufficiently elevated such that a homogeneous solution results in which the wax is completely soluble. The mixture may be warmed and held at the elevated temperature for a period of time to insure this complete solution. The mixture is then cooled to the filtration temperature set by the degree of dewaxing desired, as influenced by the properties of the wax-bearing oil and the ratio of solvent to oil. The chilling is quite commonly accomplished by passing the oil-in-solvent through a series of refrigerant-cooled heat exchangers wherein the wax which precipitates out on the cold surfaces is continually scraped off to form a slurry of wax crystals in the liquid oil and solvent. The resulting slurry passes directly from one exchanger to the next such that there is negligible residence time or heat gain between cooling stages, and the net result is essentially a gradual cooling at a uniform rate from the initial temperature to the filtration temperature. Additional solvent may be added between or during cooling stages prior to filtration to increase the ratio of solvent to oil. The filtration is usually carried out using rotary drum vacuum filters insulated from the atmosphere, but equivalent means are obviously applicable. The wax filter cake will have oil and solvent entrained or adsorbed therein, which is usually removed by stripping or distillation to recover the solvent for reuse. Repulping or recrystallization may also be used to increase wax purity. Likewise, the filtrate is stripped or distilled to recover dewaxed oil product and solvent for reuse.

Oils are also dewaxed using propane as the wax-rejecting solvent, and cooling at a uniform rate to precipitate wax by permitting the propane to flash from the solution in a controlled manner.

The dewaxing of oil gives rise to special problems not encountered in other crystallization or precipitation processes because the molecular weight and nature of the paraffins precipitating change as the temperature is lowered even though some paraffins will precipitate throughout the temperature range as their solubility decreases. Because the wax may be semi-plastic, not possessing "a" melting point, filtration can be quite troublesome. Terms such as "hard" wax, "soft" wax, and "microcrystalline" wax are often used to describe the different types of wax obtained at different temperatures depending on the nature of the oil source and the dewaxing conditions.

In operating a particular plant to dewax a given oil to a desired extent, there are a number of operating factors which may be varied within considerable limits. In practice it is found that the operating variables are interrelated such that it is often difficult or impossible to change one factor without changing others as a result. For example, the solvent composition may be altered and/or other feeds may be blended with the primary feed, but a different filtration temperature is then needed to obtain the desired dewaxing. When the oil feed rate is changed, the rate of cooling is also necessarily changed as is the time available for filtration. Hence, it is found that a plant operating line can be defined representing the optimum operation of the plant as a function of feed rate. The line labeled "plant operating line" in the attached drawing shows the effect of feed rate on dewaxed oil yield obtainable in a typical commercial dewaxing plant when treating a wax bearing oil as shown in the legend on the drawing. Thus, when the plant is operated at higher than the design feed rate, the yield of dewaxed oil decreases. Nevertheless, it is possible to increase the production of dewaxed oil by increasing the feed rate because the yield loss is proportionately less than the feed increase within a range near the design point. For example, if the demand for dewaxed oil is 8% greater than the plant was originally designed to produce, the increased production can be obtained by operating at 110% of the design throughput. The 2% loss in process efficiency is primarily attributable to the fact that at the higher throughput rate there is less time available for cooling and for the filtration of the wax from the slurry with the result that a wetter wax filter cake is produced, i.e., the filtrate is less completely removed from the solid wax.

Now, by means of the present invention, it has been found how to increase the filtration rate so that the plant feed rate can be increased without suffering a yield loss. Alternately, the yield can be increased at any given feed rate. In its most preferred embodiment, the invention increases both the feed rate and the yield so that both a greater production of dewaxed oil and a higher yield of dewaxed oil can be obtained at the same or a higher feed rate as compared to the production and yield obtained without the invention. In general, the efficiency and operability of the dewaxing process are improved by this invention.

The invention is based on the discovery that improved results are obtained if a nonuniform cooling rate is used so that the rate of cooling of the wax-bearing oil in wax-rejecting solvent is substantially slower in the middle temperature range intermediate to the initial temperature and the filtration temperature. This is surprising because heretofore it was though that it was best to use a uniform cooling rate from the initial temperature down to the filtration temperature. Although the use of slower and faster chilling rates has been investigated before, the rates were always substantially constant throughout the cooling range. Also, minor variations in the rate of cooling at various stages do not produce the benefits of this invention because the rate of cooling in the region of an intermediate temperature must be much slower than the rate of cooling from the initial temperature to the intermediate temperature and also much slower than the rate of cooling from the intermediate temperature to the filtration temperature. In the preferred practice of the invention the cooling is interrupted entirely, and the temperature is held substantially constant at a temperature above the filtration temperature for a definite period of time prior to cooling to the filtration temperature. Hereinafter this step of holding the temperature constant is sometimes referred to as digesting, a digestion step, soaking, or a soaking step. The soaking can quite conveniently be provided simply by installing a surge vessel of the desired residence time between two stages of cooling in an existing process. For best results the slurry of wax particles in oil and solvent should be relatively quiescent during soaking, without agitation.

Referring to the drawing, the points labeled 2a, 5a, 10a, and 15a indicate the increased yield of dewaxed oil obtainable at an increased feed rate, relative to the plant operation without a soaking step, with soaking or digestion at 70° F. for times of 2, 5, 10, and 15 minutes respectively. Similarly, the points labeled 2b, 5b, 10b, and 15b show the results obtainable by soaking for 2, 5, 10, and 15 minutes respectively at 50° F. The point labeled 15c shows that a soaking temperature of 30° F. for 15 minutes is too low in this particular process wherein the filtration temperature was 0° F., in that the yield loss suffered by increasing the feed rate is greater than is the case without any soaking at all.

To obtain a significant improvement the soaking time should be at least two minutes. Longer soaking or digestion times give greater benefits. However, the incremental advantage gained by going beyond about 30 minutes is proportionately small. Accordingly, the greatest advantages are obtained by using soaking times of between 5 and 20 minutes.

The temperature employed in the soaking step is quite important. It appears that the filterability of the slurry is most imporved if the soaking temperature is substantially above the filtration temperature but not so substantially below the wax nucleation point, i.e., the temperature at which wax first begins to precipitate from the solution of wax-bearing oil in wax-rejecting solvent. The temperature spread between the initial and filtration temperatures influences the temperature selected for the soaking zone. Thus, the initial temperature may be from 70° F. to 200° F. and the filtration temperature from 30° to —20° F. or lower. From the examples and description herein it will be apparent to one skilled in the art that the optimum temperature in a particular case can be determined by a few relatively simple tests using a digestion time of 10 or 20 minutes at several temperatures in the range. In general, the optimum soaking temperature is above about 40° F. when the filtration temperature is above about 0° F. and the initial temperature is above about 100° F.

The following example shows that improved filterability is obtained by employing a soaking step in accordance with the invention as compared to the prior art procedure wherein no soaking step is employed.

*Example 1*

In each of four runs a waxy lube oil raffinate was mixed with an equal volume of dewaxing solvent composed of 50% methylethylketone, 40% benzene, and 10% naphtha by volume. The mixture was heated to 165° F. to form a homogenous solution and then cooled at the rate of 10° F. per minute to 65° F. The resulting slurry was held at 65° F. for a given time, except in run 1 representing the prior practice, as shown in Table I below. After this soaking or digestion time, each slurry was then cooled at the rate of 10° F. per minute to 0° F. Two additional volumes of solvent at 20° F. were added per volume of oil feed when the slurry was at 25° F. Each slurry was filtered at 0° F. and the time required for the filtrate to pass through the filter was measured. The amount of oil recovered in the filtrate was also measured, with results as follows:

TABLE I

| Run | 1 | 2 | 3 | 4 |
|---|---|---|---|---|
| Soaking time, minutes | 0 | 5 | 10 | 20 |
| Filter time, seconds | 80 | 77 | 72 | 71 |
| Oil yield, wt. percent | 50.7 | 50.6 | 50.0 | 54.5 |

It is apparent from the above results that the soaking step improved the filterability of the slurry. Since the possible feed rate through a filter is inversely proportional to the square root of filter time, it is seen that by using a 10 minute soaking time it is possible to increase the feed rate by 5.4% as compared to the prior practice of run 1. It should also particularly be noted that the yield increased in the 20-minute case.

To investigate further the effect of variables such as time, temperature, solvent composition, and solvent dilution ratio, a series of experiments were designed to obtain a maximum of information in a minimum of testing, performed as described in the following example.

*Example 2*

In each run a solvent refined (Duosol) long residuum boiling above 650° F., composed 75% by volume of a waxy California raffinate and 25% by volume of a Mid-Continent raffinate, was used as the wax-bearing oil feed. The oil was mixed with dewaxing solvent composed of methyethylketone, benzene, and naphtha having the ketone content shown in Table II, hereinafter, and then heated to 170° F. to form a homogenous solution at the initial dilution ratio of solvent to oil, as shown. The solution was then cooled at the rate of 10° F. per

TABLE II

| Run | Soaking time, min. | Soaking temp., °F. | Ketone content, percent | Initial dilution ratio | Oil [2] yield | Filter time, sec. | Calculated [1] relative feed rate |
|---|---|---|---|---|---|---|---|
| Base case | 0 | | 50 | 0.65 | 50.7 | 87 | 100 |
| 1 | 15 | 40 | 45 | 0.7 | 56 | 92 | 96.5 |
| 2 | 5 | 40 | 55 | 0.7 | 55 | 71 | 110 |
| 3 | 15 | 70 | 55 | 1.3 | 50.6 | 53 | 127 |
| 4 | 5 | 70 | 45 | 1.3 | 51.5 | 80 | 103.5 |
| 5 | 5 | 70 | 45 | 0.7 | 55.5 | 105 | 90.5 |
| 6 | 15 | 70 | 55 | 0.7 | 53.5 | 75 | 107 |
| 7 | 5 | 40 | 55 | 1.3 | 51.1 | 56 | 123.5 |
| 8 | 15 | 40 | 45 | 1.3 | 50.7 | 73 | 109 |
| 9 | 15 | 70 | 45 | 0.7 | 56.2 | 99 | 93 |
| 10 | 5 | 70 | 55 | 0.7 | 54.8 | 70 | 110.5 |
| 11 | 15 | 40 | 55 | 1.3 | 50.7 | 51 | 129 |
| 12 | 5 | 40 | 45 | 1.3 | 50.6 | 73 | 109 |
| 13 | 10 | 55 | 50 | 1.0 | 50.6 | 69 | 111.5 |
| 14 | 10 | 55 | 50 | 2.0 | 43.5 | 63 | 116 |
| 15 | 10 | 55 | 43 | 1.0 | 51.4 | 99 | 93.5 |
| 16 | 10 | 25 | 50 | 1.0 | 53.5 | 65 | 114.5 |
| 17 | 3 | 55 | 50 | 1.0 | 50.9 | 70 | 110.5 |

[1] Theoretical rate, assumes rate proprotional to $1/\sqrt{\text{filter time}}$.
[2] Primary yield only, no repulping or washing.

minute to the indicated soaking temperature and then held at that temperature for the indicated time. The cooling process was then continued at the rate of 10° F. per minute down to the final filtering temperature, which was 0° F. in each case. Additional solvent was added at 25° F. to give a total solvent-to-oil ratio of 3 at the filter. The resulting slurries were filtered at 0° F. and the time for the filtrate to pass through the filter was measured. The oil content of the filtrate was also determined, with results as shown in Table II above.

It was found that the above data can be mathematically correlated whereby in a particular system either the feed rate or the dewaxed oil rate can be calculated as functions of the variables: soaking time, temperature, ketone content of solvent, and dilution ratio. The equations derived were applied to the operation of a known plant and solved for typical plant conditions of 50% methylethylketone solvent and 0.65 initial solvent to feed dilution ratio to determine the points previously referred to on the attached drawing.

Referring to the drawing, the surprising result is noted that a nearly straight line can be drawn through the points representing identical soaking times and that the slope of this line is such that the production rate of dewaxed oil is essentially independent of wax-bearing oil feed rate, even though the feed rate is affected by the temperature of the soaking step. Therefore, it is desirable that the soaking be carried out at the highest practical temperature, but below the wax nucleation point, to obtain the maximum yield of dewaxed oil at a given feed rate. The significance of this is that, for example, by increasing the feed rate to 104% of design, and using a soaking time of 15 minutes at 70° F., the production of dewaxed oil would be the same as if the feed rate were increased to 111% of design without a soaking step. On the other hand, the operating point is often dictated by the need to process the greatest possible amount of oil. Then the highest temperature is selected at which one can obtain the desired feed rate. For example, for 109% of design feed rate the 15 minute digestion temperature would be 50° F., at which temperature there would be no yield loss as compared to nearly 2% yield loss without the digestion step.

*Example 3*

Additional tests were carried out to determine whether warming during the soaking period would affect the filterability of the slurry, which tests were carried out in the same manner as in Example 2. The results obtained are shown in the following Table III:

art method, without a soaking period, using solvent containing 50% methylethylketone and an initial dilution ratio of 1.3. The initial temperature was 170° F.; the filtration temperature, 0° F.; and the cooling rate, 10° F. per minute. The same feed was dewaxed under the same conditions except that a soaking time of 15 minutes at 50° F. was added. The filter time with the soaking step was 26 seconds as compared to 50 seconds by the conventional procedure, and the oil yield was 73.6% as compared to 56% by the conventional method.

These results show a much greater improvement in filterability resulting from the soaking or digestion as compared to the improvement in the blend with California waxy raffinate in previous examples. The Mid-Continent oil is noted for its high content of "soft" wax of low melting point, and, accordingly, it is ordinarily a less desirable oil feed for conventional dewaxing. The new process thus permits treating less desirable oils to obtain improved results in a preferred application.

The effect produced by this invention is not simply one of reducing the overall rate of chilling, as shown by the following example.

*Example 5*

Laboratory tests were carried out, using a mixture of lubricating oil feeds to a commercial dewaxing plant, in substantially the same manner as the foregoing examples. In this example the wax filter cake was washed and repulped with recycle solvent and refiltered, thereby closely duplicating usual plant operations. The test conditions and results are shown in the following Table IV:

TABLE IV

| Test Number | 1 | 2 | 3 |
|---|---|---|---|
| Conditions: | | | |
| Chilling rate, ° F./min | 10 | 5 | 10 |
| Digestion at 45° F., minutes | | | 15 |
| Dilution ratios: | | | |
| Initial | 0.65 | 0.65 | 0.65 |
| Recycle filtrate | 2.35 | 2.35 | 2.35 |
| Primary wash | 0.5 | 0.5 | 0.5 |
| Repulp | 2.0 | 2.0 | 2.0 |
| Repulp wash | 0.5 | 0.5 | 0.5 |
| Results: | | | |
| Primary filter time, seconds | 108 | 100 | 94 |
| Repulp filter time, seconds | 24 | 22 | 22 |
| Oil yield, wt. percent | 68.9 | 68.5 | 70.6 |
| Relative plant feed rate | 1.0 | 1.040 | 1.075 |
| Relative oil production rate | 1.0 | 1.039 | 1.077 |

Oil yield adjusted for oil content of recycle filtrate, 10.0 wt. percent. All dilutions and washes made with corresponding plant streams.
Relative feed rate assumes that rate is proportional to $1/\sqrt{\text{filter time}}$.

It will be noted that cutting the chilling rate in half,

TABLE III

| Run | Soaking time, min. | Soaking temp., ° F. | Ketone content, percent | Initial dilution ratio | Oil yield | Filter time, sec. | Calculated relative feed rate |
|---|---|---|---|---|---|---|---|
| 1 | 10 | ¹40 | 50 | 1.3 | 50.9 | 62 | 117 |
| 2 | 10 | 50 | 50 | 1.3 | 50.8 | 62 | 117 |
| 3 | 20 | ¹50 | 50 | 1.3 | 49.5 | 64 | 115.5 |
| 4 | 20 | 40 | 50 | 1.3 | 47.3 | 58 | 120 |

¹ Heated 5° F.; other two runs heated 10° F.

The above data of Table III agree with the runs presented in Table II of Example 2, as do the runs reported in Table I of Example I. From this it can be concluded that reheating to the extent of 5–10° F. has no significant effect on the operation, and heat leakage into the soaking zone is not a serious factor.

The following example shows that the magnitude of the effect varies depending on the properites of the oil being treated.

*Example 4*

A feed composed entirely of the raffinate of Mid-Continent petroleum was dewaxed according to the prior which would require doubling the number of scraped chillers in a commercial plant, increased the possible feed rate by only 4%, which was not quite matched by an increase in oil production rate. Thus, slowing down the chilling rate did not improve the yield of dewaxed oil. In contrast, using the original chilling rate interrupted in accordance with the invention, hence requiring no capital expenditure for heat exchangers but only a vessel at which the slurry is digested at 45° F. for 15 minutes, increased the possible feed rate by 7.5% and further increased the production of dewaxed oil by an even greater amount.

In the foregoing examples additional solvent was added after the digestion step, prior to filtration. It appears that this invention achieves the greatest improvement when a relatively lower solvent to oil ratio of between 0.6 and 1 is used during the soaking or digestion step as compared to the relatively higher solvent to oil ratio of between 1 and 4 at the filtration step. Also, it is noted from the foregoing examples that the greatest improvements are obtained when the solvent contains at least 50% ketone. Hence, the use of at least 50% methylethylketone in the solvent is preferred in the invention.

It is contemplated that the operation of the solvent and product recovery units in the solvent dewaxing plant using this invention will be substantially similar to procedures presently used. Of course, where a higher yield of dewaxed oil is obtained, the wax filter cake will be drier. Hence, economies can be obtained in the treatment of the wax to separate entrained solvent and oil, and the degree of repulping and further refinement required will be less.

In some cases it will be found advantageous to use more than one digestion step at different temperatures. Also, for example when the oil is very waxy, two or more stages of filtration may be used with soaking at temperatures intermediate to the filtration temperatures.

I claim:

1. A dewaxing process which comprises cooling a wax-bearing oil in wax-rejecting solvent from an initial temperature above about 100° F. and above the wax nucleation point to an intermediate temperature between 40° and 70° F. and below the wax nucleation point but substantially above a filtration temperature, maintaining the temperature of said wax-bearing oil in wax-rejecting solvent substantially constant at said intermediate temperature for from 5 to 30 minutes, then further cooling said wax-bearing oil in wax-rejecting solvent from said intermediate temperature to the filtration temperature at substantially the same rate of cooling as in the first-mentioned cooling step, and filtering the precipitated wax from the resulting slurry at said filtration temperature.

2. The process of claim 1 wherein the temperature is held substantially constant at said intermediate temperature for from 5 to 20 minutes.

3. The process of claim 1 wherein said wax-rejecting solvent comprises at least 50% methylethylketone.

4. The process of claim 1 wherein additional solvent is added to the slurry of wax in wax-bearing oil and wax-rejecting solvent at a point in the process between said intermediate temperature and said filtration temperature.

5. The process of claim 1 wherein the ratio of solvent to oil while maintaining the temperature of said wax-bearing oil in wax-rejecting solvent substantially constant is in the range between 0.5 and 1.

6. The method of increasing the production of dewaxed oil without loss of yield of dewaxed oil, in a dewaxing process for treating a wax-bearing oil by mixing said oil with a solvent comprising methyl ethyl ketone selective for nonparaffinic constituents, forming a homogenous solution, cooling in stages to a filtration temperature set by the degree of dewaxing desired by passing said oil and solvent through a series of progressively colder refrigerant-cooled heat exchangers wherein wax precipitates to form a slurry of wax crystals in oil and solvent, and then filtering wax crystals from the slurry at the filtration temperature;

which method comprises soaking said slurry between stages of cooling by holding partially-cooled slurry effluent of a prior stage of cooling in a surge vessel for between 5 and 20 minutes at a substantially constant temperature below the wax nucleation point and in the range of about 40–70° F., and then passing the soaked slurry to the next stage of cooling, whereby the filterability of wax in the slurry is improved and production of dewaxed oil can be increased without loss of yield by increasing the feed rate of wax-bearing oil.

References Cited by the Examiner

UNITED STATES PATENTS

| 1,974,398 | 9/1934 | Ellsberg | 208—33 |
| 2,280,260 | 4/1942 | Pokorny | 208—33 |
| 2,410,483 | 11/1946 | Dons et al. | 208—33 |

PAUL M. COUGHLAN, *Primary Examiner.*

ALPHONSO D. SULLIVAN, DELBERT E. GANTZ, *Examiners.*

H. LEVINE, *Assistant Examiner.*